(12) United States Patent
Marino et al.

(10) Patent No.: US 7,778,833 B2
(45) Date of Patent: Aug. 17, 2010

(54) METHOD AND APPARATUS FOR USING COMPUTER GENERATED VOICE

(75) Inventors: Anna Marino, Hampshire (GB); J. Brian Pickering, Hampshire (GB)

(73) Assignee: Nuance Communications, Inc., Burlington, MA (US)

( * ) Notice: Subject to any disclaimer, the term of this patent is extended or adjusted under 35 U.S.C. 154(b) by 987 days.

(21) Appl. No.: 10/703,121

(22) Filed: Nov. 6, 2003

(65) Prior Publication Data

US 2004/0122668 A1 Jun. 24, 2004

(30) Foreign Application Priority Data

Dec. 21, 2002 (GB) ................................. 0229860.2

(51) Int. Cl.
*G10L 13/00* (2006.01)

(52) U.S. Cl. ........................................ 704/258; 704/260

(58) Field of Classification Search ................. 704/258, 704/260, 261; 379/67.1, 88.16, 88.18
See application file for complete search history.

(56) References Cited

U.S. PATENT DOCUMENTS

| 5,636,325 | A | * | 6/1997 | Farrett ........................ 704/258 |
| 6,035,273 | A | * | 3/2000 | Spies ........................... 704/270 |
| 6,163,769 | A | * | 12/2000 | Acero et al. .................. 704/260 |
| 6,804,649 | B2 | * | 10/2004 | Miranda ....................... 704/258 |
| 6,829,581 | B2 | * | 12/2004 | Meron ......................... 704/258 |
| 6,970,820 | B2 | * | 11/2005 | Junqua et al. ................ 704/258 |
| 2002/0120450 | A1 | * | 8/2002 | Junqua et al. ................ 704/258 |
| 2002/0193994 | A1 | * | 12/2002 | Kibre et al. .................. 704/260 |
| 2003/0028380 | A1 | * | 2/2003 | Freeland et al. ............. 704/260 |
| 2003/0088419 | A1 | * | 5/2003 | Fukuzato ..................... 704/258 |
| 2004/0047453 | A1 | * | 3/2004 | Fraser ....................... 379/88.18 |
| 2004/0111271 | A1 | * | 6/2004 | Tischer ....................... 704/277 |

* cited by examiner

*Primary Examiner*—Richemond Dorvil
*Assistant Examiner*—Douglas C Godbold
(74) *Attorney, Agent, or Firm*—Wolf, Greenfield & Sacks, P.C.

(57) ABSTRACT

This invention relates to a method and apparatus for computer generated voice in an interactive voice response system (IVR). A user will normally be able to identify the pre-recorded segments from the synthesized ones played by the IVR. According to an aspect of the invention there is provided a method of processing voice prompts in an IVR. The method can include: identifying a set of voice prompts within an application for output in a single voice, the set having a pre-recorded voice prompt and a computer generated voice prompt; providing reference voice characteristics formed from the pre-recorded voice prompt; and playing the computer generated voice prompt using the reference voice characteristics whereby the computer generated voice prompt sounds like the pre-recorded voice prompt.

9 Claims, 4 Drawing Sheets

METHOD AND APPARATUS FOR USING COMPUTER GENERATED VOICE

CROSS-REFERENCE TO RELATED APPLICATIONS

This application claims the benefit of United Kingdom Application No. 0229860.2, filed in the United Kingdom Patent Office on Dec. 21, 2002, the entirety of which is incorporated herein by reference.

BACKGROUND

1. Field of the Invention

This invention relates to a method and apparatus for using computer generated voice. In particular it relates to a method and apparatus for using computer generated voice in an interactive voice response system.

2. Background of the Invention

A typical business interaction between a user and a business agent involves the agent talking to the user, asking questions, entering responses into a computer, and reading information to the user from a terminal screen. Such an interaction can be used to place a catalogue order; check an airline schedule; query a price; review an account balance; notify a customer; and record and retrieve a message. For logical processes this can be automated by substituting the agent with an interactive voice response system (IVR) having an ability to play voice prompts and receive user input by speech recognition or from DTMF tones.

An interactive voice response system is typically implemented using a client server configuration where the telephone interface and voice application run on the client machine and a voice data supply server software such as text-to-speech or a voice prompt database runs on a server with a local area network connecting the two machines. When the voice application requires voice data it requests a voice server to start streaming the voice data to the client. The client waits until a certain amount of voice data has been accumulated in a buffer and then plays voice data on an open telephone channel.

Voice applications will often have both static and dynamic data. Whilst it would be recommended to develop such applications using pure text-to-speech (TTS) technologies or pure pre-recorded audio segments, in reality many applications will have a mixture of pre-recorded audio segments and TTS sentences. The solution typically increases the naturalness of the application due to pre-recorded segments. Unfortunately it is often the case that the vocal features of the pre-recorded features significantly differ from those of the TTS engine settings. These differences could be the tone of the voice, the speed and the pitch. The overall result is an application where the user identifies the pre-recorded segments from the synthesized ones leading to user fatigue and potentially miscomprehension.

DISCLOSURE OF THE INVENTION

According to an aspect of the invention there is provided a method of processing voice prompts in an interactive voice response system (IVR) comprising:

identifying a set of voice prompts within an application for output in a single voice, said set having a pre-recorded voice prompt and a computer generated voice prompt;

providing reference voice characteristics formed from the pre-recorded voice prompt;

playing the computer generated voice prompt using the reference voice characteristics whereby the computer generated voice prompt sounds like the pre-recorded voice prompt.

The above solution is embodied by an IVR which can modify text-to-speech (TTS) engine parameters in order to morph the synthesized voice into one that is close to the pre-recorded audio segments. This is achieved by analyzing pre-recorded segments to gather parameters about the voice features of the speaker and using the parameters obtained as input to the TTS engine. The result is a voice synthesized with features extracted from the speaker of the pre-recorded segments. The more parameters mapped from the pre-recorded segments, the better the match should be. Furthermore, the use of an ad-hoc application to provide the adaptation of the synthesized speech allows the user to readapt the TTS to newly acquired audio segments or to applications with segments recorded from a different speaker.

Whilst the procedure described does not guarantee that the quality of the synthesized speech will be identical to the one of the real speaker, the closeness, naturalness, pleasantness and quality of the application should improve.

The computer generated voice prompt is created using a text-to-speech generator with text and the reference voice characteristics as input.

The reference voice characteristics are determined by an excitation function.

The voice unit is preferably a phoneme but may also be a diphone and/or a polyphone (diphones are more complex than phonemes and include the transitions between phonemes). The polynomial estimate of the excitation energy wave form is extracted from the pre-recorded phoneme and stored in association with the phoneme. This polynomial is used as input to the text to speech generator.

The reference voice characteristics maybe formed from a partial set of voice units taken from pre-recorded voice prompts and the method further comprises predicting the voice characteristics of missing voice units based on the partial set. The prediction algorithm will advantageously be statistically based.

BRIEF DESCRIPTION OF THE DRAWINGS

In order to promote a fuller understanding of this and other aspects of the present invention, an embodiment of the invention will now be described, by means of example only, with reference to the accompanying drawings in which.

DESCRIPTION OF THE PREFERRED EMBODIMENT

Figure 1:
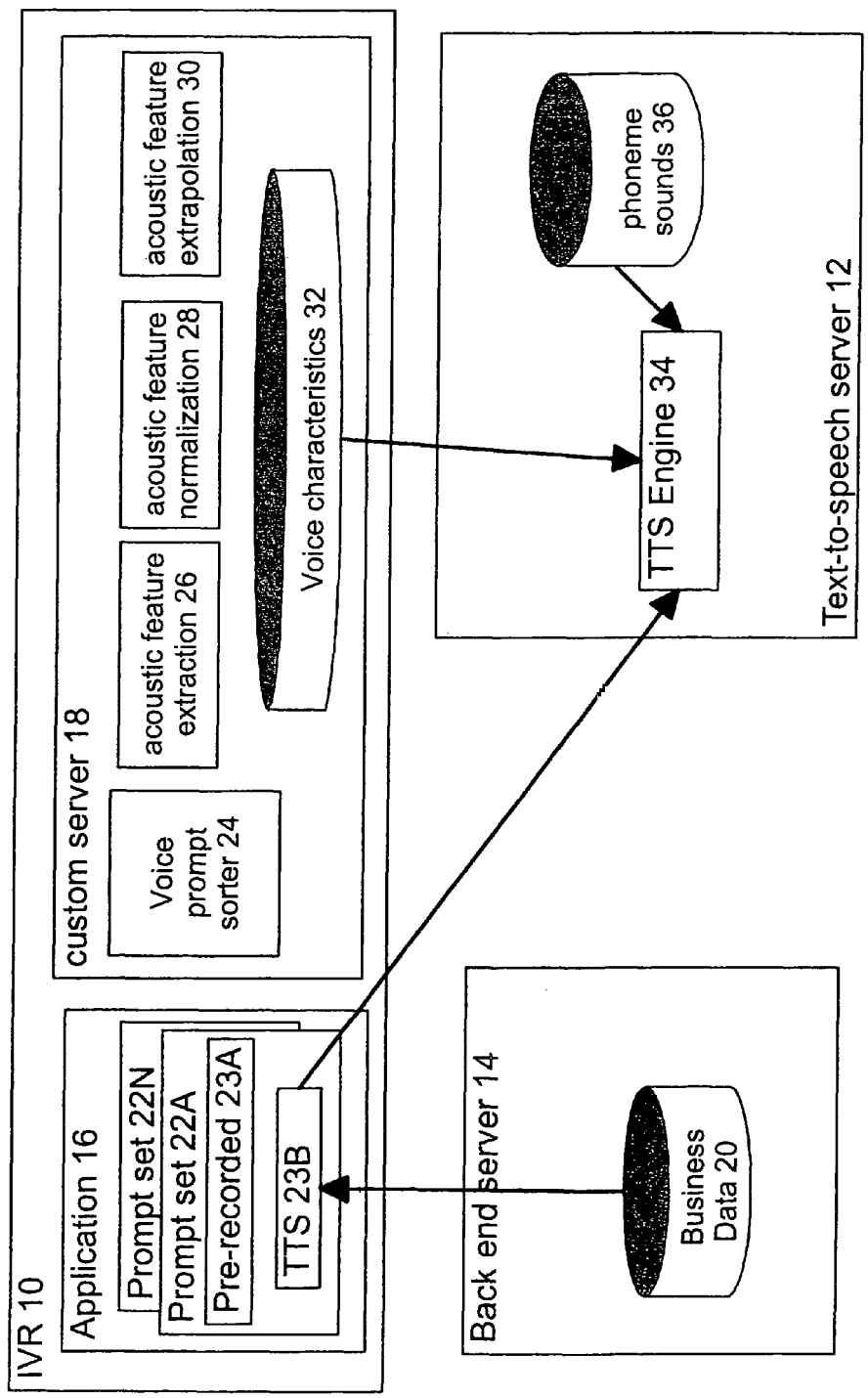
FIG. 1 is a schematic overview of the embodiment of the invention.

Referring to FIG. 1 there is shown a schematic overview of an embodiment of the invention including: an interactive voice response system (IVR) 10; a text-to-speech server 12 and a back end server 14. Today's voice system applications are typically deployed in a three tier fashion where the first tier is the IVR (10) including: a voice application 16 and a custom server 18. The second tier is the text-to-speech server 12 comprising TTS engine 34 and phoneme sounds database 36. The third tier is the back end server 14 comprising business data 20 used in application 16.

The voice application 16 contains instructions in VoiceXML for controlling the IVR (10) in an interaction with a user. The application has one or more prompt sets 22A . . . 22N which identify prompts of the same voice. Two types of instructions play voice prompts: a first type 23A plays a pre-recorded voice prompt to the user and a second type 23B plays text through the text-to-speech server 12. The embodiment is specifically directed to a scenario in which an application has a mixture of pre-recorded voice prompts and TTS voice prompts. The text prompt can be derived from business data 20.

The custom server 18 comprises: a voice prompt sorter 24; an acoustic feature extraction component 26; an acoustic feature normalization component 28; an acoustic feature extrapolation component 30; and a voice characteristics database 32.

Although the present embodiment only discusses a single voice in one application, many voices in the same application can be managed by the voice prompt sorter 24. The voice prompt sorter 24 scans an application for the number of voice sets within and then categorizes each occurrence of a voice prompt into one of the voice sets. In VoiceXML such voice sets are marked-up identifiers such as <voice1> and <voice2>.

Figure 2:
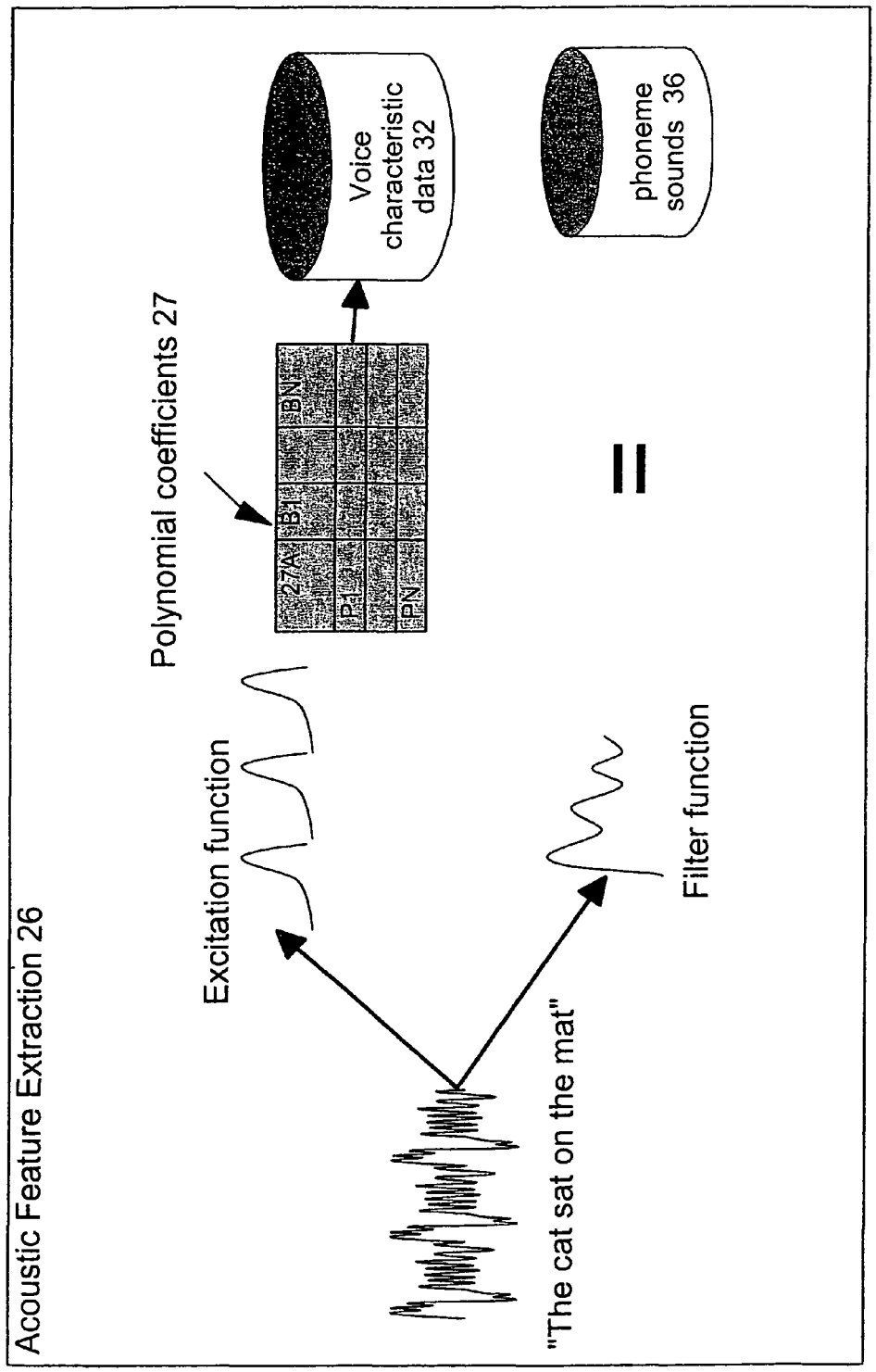
FIG. 2 is a schematic of the acoustic feature extraction component of the embodiment of the invention.
Figure 4:
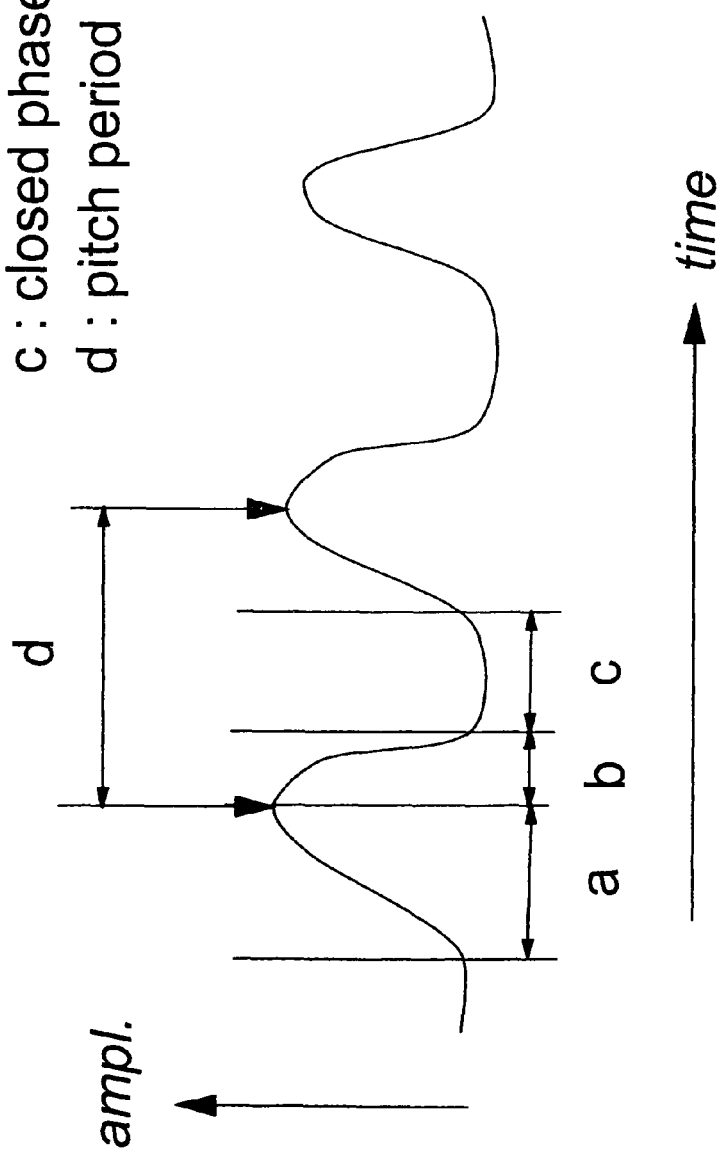
FIG. 4 is a schematic of the excitation function.

The acoustic feature extraction component 26 is described with reference to FIGS. 1 and 2. A pre-recorded prompt "The cat sat on the mat" is input to the acoustic feature extraction component 26. The speech is broken down into phonemes, and each phoneme assigned a duration which is directly measured from the audio signal itself once the phonemes have been aligned with it. Note: time alignment of phoneme-labels is a standard component of speech recognition technology and, as such, is not described here. In addition, the original wave form is analyzed to extract the excitation function which is the source of the original speech. It represents typical airflow through the vocal cords as illustrated in FIG. 4. For each pitch period (that is a single opening-and-closing of the vocal cords), for the typical male speaker, the vocal cords will gradually move apart (the opening phase) to achieve maximal airflow through the larynx. Then, the vocal cords will begin to close again, which is typically, because of muscular tension, far quicker than the opening phase. Finally, for a typical adult male, the vocal cords will remain closed for a certain portion of the pitch period (this is the closed-phase), before beginning to open again. This whole cycle determines the way in which the filter function is excited to generate the output speech signal. In addition to the durations of the phonemes extracted previously, the amount of time (as a percentage) during the pitch period that the cords open, close and remain closed is estimated and stored in the phoneme database 36. The output of this process is a wave form approximated to coefficients of a polynomial indicated by reference 27 in FIG. 2. The left hand column of 27 (P1 . . . PN) identifies the phoneme and the top row (B1 . . . BN) identifies the coefficient in the polynomial approximation. The excitation function coefficients for each phoneme are with a particular voice and are stored in the voice characteristics database 32. Typical values for the excitation function for a male speaker would be 45%, 20% and 35% for opening, closing and closed phases, whereas for a typical adult female these tend to drift to some 60% and 40% but with no closed phase. The filter function coefficients, commonly reduced to a set of 3 or 4 formant centre frequencies and bandwidths, are similar to those stored in the phoneme sound database and used by the TTS server 12. When the TTS server has to generate a voice prompt, it uses the values from the phoneme sound database to determine what filter function should be used to generate that sound. In most TTS servers, a standard excitation function is applied to these filter characteristics to generate the voice prompt. In this invention, though, the excitation characteristics extracted (the duration within each pitch cycle of opening to closing to closed phases) are substituted. In this way, that is substituting the excitation characteristics extracted from the pre-recorded prompts, the TTS output voice will now be generated with a close approximation to the tone of the pre-recorded speaker.

The acoustic feature normalization component 28 normalizes the coefficients in order to provide parameters that are independent of the recordings being used for the analysis.

The acoustic feature extrapolation component 30 approximates coefficients for phonemes that are not present in the pre-recorded prompts but which might be needed in the TTS prompts. The approximations are made using a statistical predication algorithm and the existing filter function coefficients.

The voice characteristic database 32 stores the filter function coefficients received from the acoustic feature extraction component 26, as normalized by the acoustic feature normalization component 28 and as approximated by the extrapolation component 30. The excitation function coefficients are input to the TTS server 12 to effect the formant frequencies used to generate the TTS voice.

The TTS server 12 includes a TTS engine 34 and a database of phoneme sounds 36. Input to the TTS engine 34 is from the voice characteristics database 32, the phoneme sounds database 36 and the text of the prompt 22B from the voice application 16. The phoneme sounds database 36 is the excitation filter function set of basic voice units for all phonemes without any speaker characteristics and the voice characteristics database 32 is the filter excitation function wave form. TTS production in TTS engine 34 involves two major steps: a natural language analysis and digital speech generation. The former takes a sentence to be output and parses it to generate syntactic information (e.g. word list, part of speech). Then it performs letter to sound transcriptions to identify the phoneme to be used for the synthesis. For each phoneme, the latter takes in the basic excitation wave form from the phoneme sound database 36 and then a particularly voiced phoneme filter function from the voice characteristic database 32. The TTS engine combines the acquired excitation wave form with the filter function wave form to get a correctly voiced phoneme. The TTS engine mixes the combined wave form with additional syntactical information and uses it to generate digital speech. This process also needs specific details about the parameters needed by the rest of text-to-speech server 12 to generate a given phoneme plus additional information for the prosody.

Figure 3:
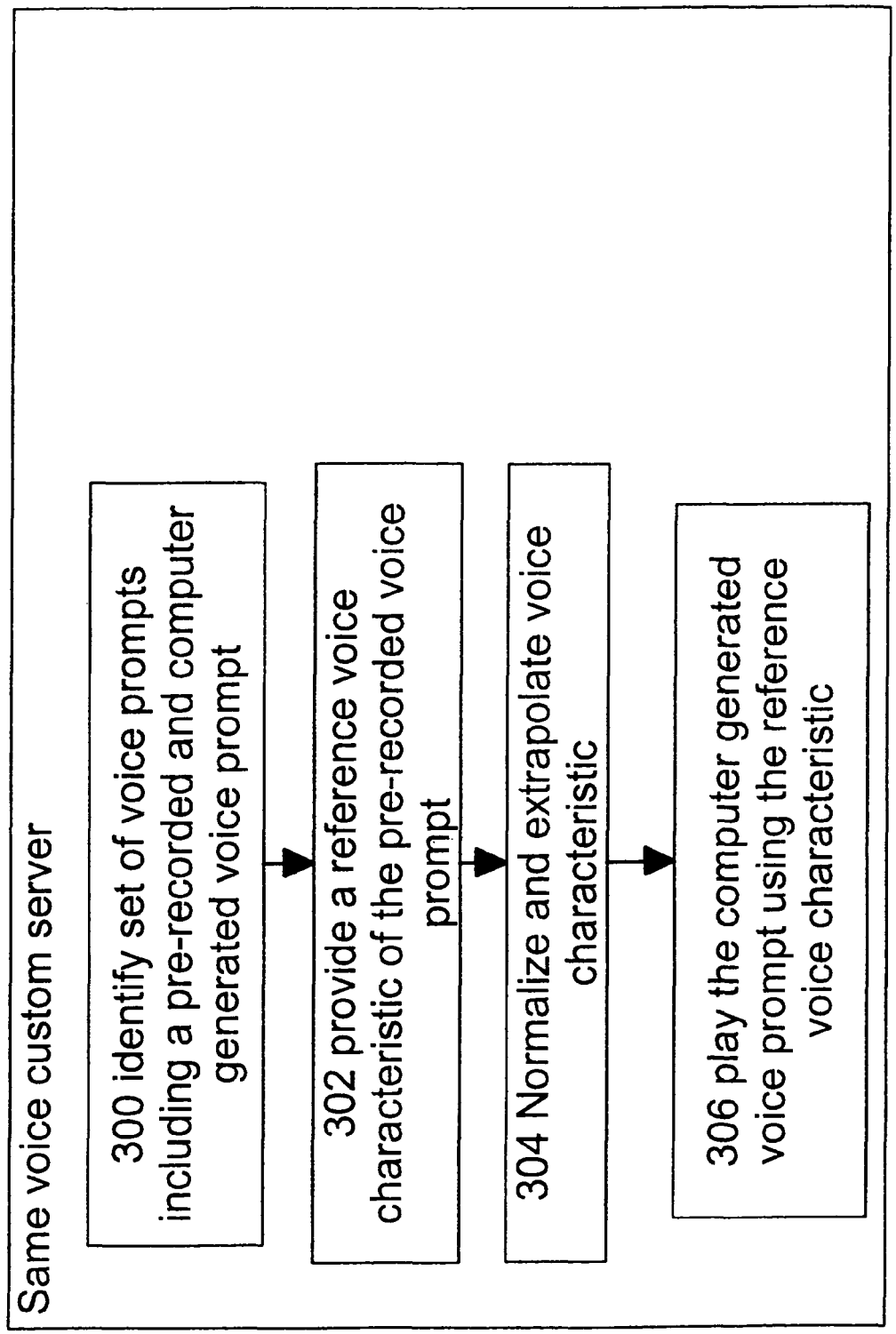
FIG. 3 is a schematic flow diagram of the method of the embodiment of the invention.

The method of the embodiment is explained with reference to FIG. 3. Step 300 identifies a set of voice prompts 22A including a pre-recorded and computer generated voice prompt. This step is not necessary when the voice application only has one voice, either synthesized or prerecorded. The step is performed by voice prompt sorter 24.

Step 302 provides, by virtue of the acoustic features extraction component 26, reference voice characteristic of the pre-recorded voice prompt and stores this in voice characteristics database 32.

Step 304 normalizes and extrapolates the voice characteristics at the normalization component 28 and extrapolation component 30 respectively.

Step 306 plays the computer generated voice prompt using the reference voice characteristic and the TTS server 12.

For example, a voice application comprises two voice prompts to be spoken in a single voice: a pre-recorded "The cat sat on the mat" and a TTS prompt "at 10 o'clock". The first part of the method identifies that both voice prompts are to be spoken with the same voice using the voice prompt sorter 24. In the next part the acoustic feature extraction 26 finds the excitation function coefficients for each phoneme in the pre-recorded prompt "The cat sat on the mat" and stores this in the voice characteristic database. These voice coefficients are normalized and extrapolated for phonemes which are not found in the pre-recorded prompt. The last step plays the TTS prompt "at 10 o'clock" using the voice characteristics extracted from "The cat sat on the mat".

FIG. 4 is a schematic of the excitation function, which shows the parameters extracted to represent the speaker's tone of voice.

Although VoiceXML applications are described here, Java or State table software components coded in a platform specific and proprietary scripting language may also be used.

What is claimed is:

1. A method of processing voice prompts in an interactive voice response system (IVR) comprising:
    scanning an IVR application having pre-recorded voice prompts and voice prompt text for rendering through text-to-speech conversion computer generated voice prompts, and categorizing each occurrence of a voice prompt by associating each voice prompt with an identifier, wherein each identifier is associated with a single voice and all voice prompts associated with a particular identifier define a voice prompt set;
    sorting each voice prompt set and identifying within each voice prompt set each pre-recorded voice prompt and each computer generated voice prompt;
    generating reference voice characteristics from a pre-recorded voice prompt of each voice prompt set, wherein generating each reference voice characteristic comprises
        decomposing a pre-recorded voice prompt into phonemes and assigning a duration to each phoneme measured from an audio signal corresponding to the pre-recorded voice prompt,
        approximating phonemes not present in the pre-recorded voice prompt,
        determining a plurality of polynomial filter function coefficients based upon the phonemes,
        extracting an excitation function from a waveform of the audio signal and determining a plurality of polynomial excitation function coefficients based upon the excitation function, and
        normalizing each of the coefficients;
    modifying the computer generated voice prompts, using the reference voice characteristics generated from the pre-recorded voice prompt, to provide modified computer generated voice prompts; and
    playing, in response to a user input, voice prompts required by the IVR application, the voice prompts including a mixture of the pre-recorded voice prompts and the modified computer generated voice prompts associated with a single voice, wherein the modified computer generated voice prompts in the mixture of voice prompts sound like the pre-recorded voice prompts associated with the single voice.

2. The method as in claim 1 wherein each computer generated voice prompt uses a database of basic voice units with a corresponding database of reference voice characteristics for each voice unit.

3. The method as in claim 1 wherein the reference voice characteristics comprise an estimated excitation function for each voice unit.

4. The method as in claim 1 wherein the reference voice characteristics are formed from a partial set of voice units extracted from pre-recorded voice prompts and the method further comprises predicting the voice characteristics of missing voice units based on the partial set.

5. The method as in claim 1 wherein the modified computer generated voice prompts associated with the single voice are substantially indistinguishable by the user from the pre-recorded voice prompts associated with the single voice.

6. A method of processing voice prompts in an interactive voice response system (IVR) comprising:
    scanning an IVR application having pre-recorded voice prompts and voice prompt text for rendering through text-to-speech conversion computer generated voice prompts, and categorizing each occurrence of a voice prompt by associating each voice prompt with an identifier, wherein each identifier is associated with a single voice and all voice prompts associated with a particular identifier define a voice prompt set;
    sorting each voice prompt set and identifying within each voice prompt set each pre-recorded voice prompt and each computer generated voice prompt;
    generating reference voice characteristics from a pre-recorded voice prompt of each voice prompt set;
    modifying the computer generated voice prompts, using the reference voice characteristics generated from the pre-recorded voice prompt, to provide modified computer generated voice prompts; and
    playing, in response to a user input, voice prompts required by the IVR application, the voice prompts including a mixture of the pre-recorded voice prompts and the modified computer generated voice prompts associated with a single voice, wherein the modified computer generated voice prompts in the mixture of voice prompts sound like the pre-recorded voice prompts associated with the single voice.

7. The method as in claim 6 wherein the modified computer generated voice prompts associated with the single voice are substantially indistinguishable by the user from the pre-recorded voice prompts associated with the single voice.

8. The method as in claim 6 wherein the reference voice characteristics are formed from a partial set of voice units extracted from pre-recorded voice prompts, further comprising predicting the voice characteristics of missing voice units based on the partial set of voice units.

9. The method as in claim 6, further comprising generating new reference voice characteristics from at least one new or different pre-recorded voice prompt.

* * * * *